US009075733B1

(12) United States Patent
Feldman et al.

(10) Patent No.: US 9,075,733 B1
(45) Date of Patent: Jul. 7, 2015

(54) SELECTIVE STORAGE OF ADDRESS MAPPING METADATA IN A SYSTEM HAVING MULTIPLE MEMORIES

(75) Inventors: Timothy R. Feldman, Louisville, CO (US); Wayne H. Vinson, Longmont, CO (US); Brett A. Cook, Longmont, CO (US); Jonathan W. Haines, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 50 days.

(21) Appl. No.: 13/218,302

(22) Filed: Aug. 25, 2011

Related U.S. Application Data

(63) Continuation of application No. 12/783,701, filed on May 20, 2010, now abandoned.

(51) Int. Cl.
*G06F 12/00* (2006.01)
*G06F 12/10* (2006.01)
*G06F 12/02* (2006.01)
*G06F 3/06* (2006.01)

(52) U.S. Cl.
CPC ............ *G06F 12/10* (2013.01); *G06F 12/0292* (2013.01); *G06F 2212/7201* (2013.01); *G06F 3/0679* (2013.01); *G06F 3/064* (2013.01); *G06F 3/0656* (2013.01)

(58) Field of Classification Search
CPC ................. G06F 3/064; G06F 3/0679; G06F 2212/7201; G06F 3/0656; G06F 12/0292; G06F 12/1009; G06F 12/10

USPC ...................... 711/118, 103, 104, 206, 170, 5
See application file for complete search history.

(56) References Cited

U.S. PATENT DOCUMENTS

| 5,226,133 | A | * | 7/1993 | Taylor et al. | 711/207 |
|---|---|---|---|---|---|
| 6,324,634 | B1 | * | 11/2001 | Yoshioka et al. | 711/205 |
| 7,610,445 | B1 | * | 10/2009 | Manus et al. | 711/113 |
| 7,941,631 | B2 | * | 5/2011 | Champagne et al. | 711/207 |
| 8,407,449 | B1 | * | 3/2013 | Colon et al. | 711/206 |
| 2003/0041222 | A1 | * | 2/2003 | Akey et al. | 711/165 |
| 2003/0115414 | A1 | * | 6/2003 | Tomita | 711/114 |
| 2004/0065744 | A1 | * | 4/2004 | Shiraishi et al. | 235/492 |
| 2005/0068802 | A1 | * | 3/2005 | Tanaka | 365/145 |
| 2006/0277388 | A1 | * | 12/2006 | Paley et al. | 711/173 |
| 2007/0028034 | A1 | * | 2/2007 | Nishihara | 711/103 |
| 2008/0250188 | A1 | * | 10/2008 | Nakanishi et al. | 711/1 |
| 2009/0157950 | A1 | * | 6/2009 | Selinger | 711/103 |
| 2011/0119456 | A1 | * | 5/2011 | Ipek et al. | 711/162 |

* cited by examiner

*Primary Examiner* — Hong Kim
(74) *Attorney, Agent, or Firm* — Cesari & Reed LLP; Kirk A. Cesari; David K. Lucente

(57) ABSTRACT

This disclosure is related to systems and methods for selective metadata storage in a system having multiple memories. In one example, a device may include a control circuit configured to selectively store a metadata base map in a first memory or a second memory. The metadata base map may include information to determine a physical memory address from a logical block address. The control circuit may also be configured to store metadata updates separately from the metadata base map. The metadata updates may comprise changes to the metadata base map. The control circuit may also be configured to selectively store the metadata updates in the first memory or the second memory based on characteristics of the device.

20 Claims, 5 Drawing Sheets

SELECTIVE STORAGE OF ADDRESS MAPPING METADATA IN A SYSTEM HAVING MULTIPLE MEMORIES

CROSS-REFERENCE TO RELATED APPLICATION

The present application is a continuation of and claims priority of U.S. patent application Ser. No. 12/783,701 filed on May 20, 2010.

BACKGROUND

Some data storage devices map logical addresses to physical addresses and may need to manage significant amounts of metadata stored in a memory. In addition, the metadata may have characteristics that are not ideal to store it in the memory. Thus, a new system to manage metadata in a data storage device is needed.

SUMMARY

In one embodiment, a device may include an interface to receive a command from a host system. The command may include a logical block address. The device may also include a first memory of a first memory type, a second memory of a second memory type that is different than the first memory type, and a controller coupled to the interface, the first memory, and the second memory. The controller may be configured to selectively store a metadata base map in the first memory or the second memory. The metadata base map may include information to allow the controller to determine a physical memory address from the logical block address. The controller may also be configured to store metadata updates separately from the metadata base map. The metadata updates may comprise changes to the metadata base map. The controller may further be configured to selectively store the metadata updates in the first memory or the second memory based on characteristics of the device.

In another embodiment, a device may include a control circuit configured to selectively store a metadata base map in a first memory or a second memory. The metadata base map may include information to determine a physical memory address from a logical block address. The control circuit may also be configured to store metadata updates separately from the metadata base map. The metadata updates may comprise changes to the metadata base map. The control circuit may also be configured to selectively store the metadata updates in the first memory or the second memory based on characteristics of the device.

In yet another embodiment, a computer readable medium may have instructions to cause a processor to perform a process. The process may include selectively storing a metadata base map in a first memory or a second memory, storing metadata updates separately from the metadata base map, and selectively storing the metadata updates in the first memory or the second memory based on characteristics of the device.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
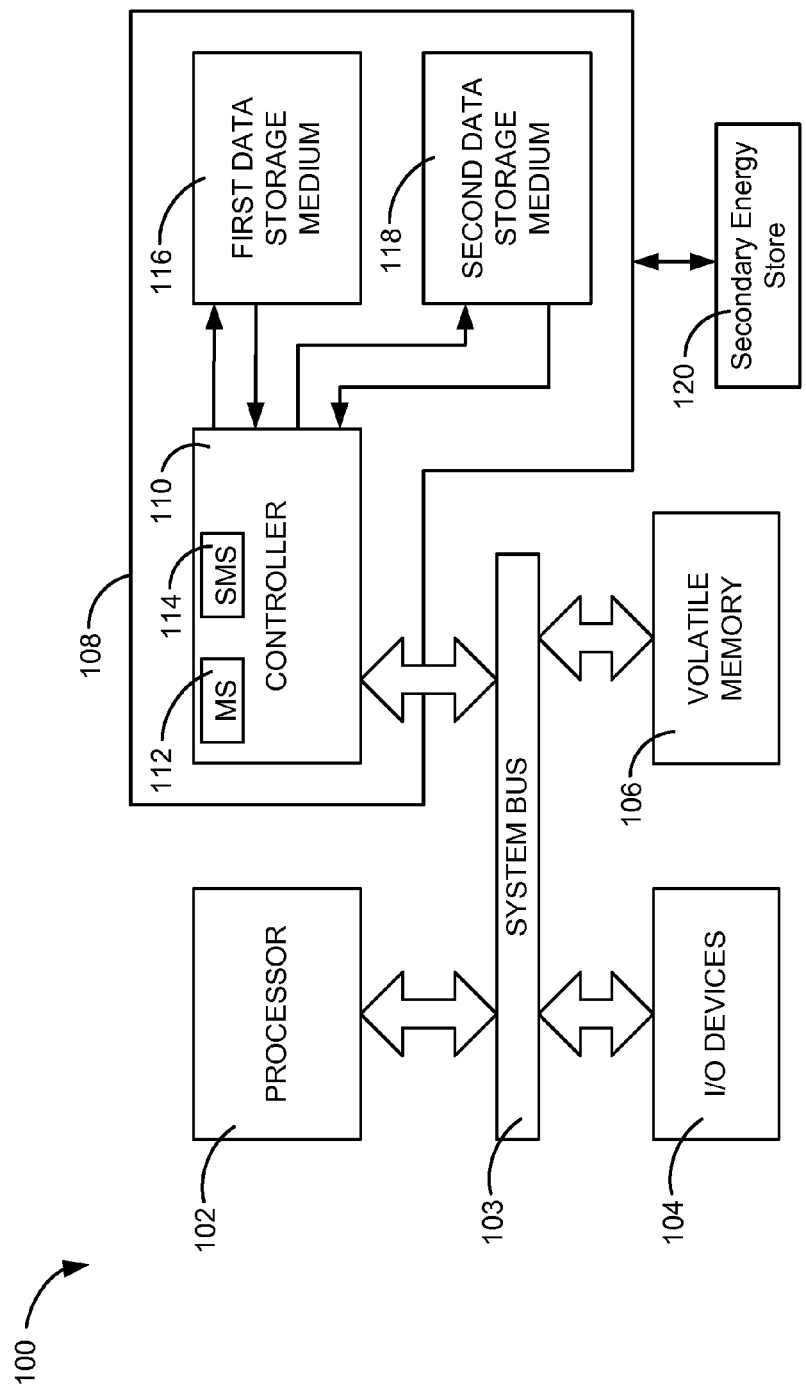
FIG. 1 is a diagram of an illustrative embodiment of a system having selective metadata management.

Referring to FIG. 1, a particular embodiment of a system having selective metadata management is shown and generally designated 100. The system 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus 103 may also be coupled to a data storage device 108. In a particular embodiment, the data storage device 108 comprises a solid state data storage device, such as a Flash memory device. In another embodiment, the data storage device 108 comprises a hybrid data storage device having both non-volatile solid state memory and a disc memory.

The data storage device 108 may be a removable data storage device that includes a connector (not shown) to allow the data storage device 108 to be plugged into and unplugged from the system 100, for example via cable. The data storage device 108 may include a controller 110, which may be coupled to the processor 102 via a connection through the system bus 103. The controller 110 may include a mapping system module 112 adapted to implement a logical block address to physical block address mapping system and a selective metadata storage module 114.

The data storage device 108 may also contain a first data storage medium 116 and a second data storage medium 118. In a particular embodiment, the first data storage medium 116 and the second data storage medium 118 are both non-volatile memory and different types of memory. For example, the first data storage medium 116 may be a non-volatile random access memory (NVRAM) and the second data storage medium 118 may be a Flash memory. The first data storage medium 116 and the second data storage medium 118 may include multiple integrated circuit memory chips. For example, the data storage medium 118 may be Multi-Level Cell (MLC) NAND Flash memory or Single-Level Cell (SLC) NAND Flash memory. In another example the first data storage medium 116 may be a magnetic disc data storage medium and the second data storage medium 118 may be a Flash memory.

The data storage device 108 may communicate with the processor 102 via an interface (not shown) adapted to receive commands and data from the processor 102. Further, the data storage device 108 may be configured to implement the selective metadata storage module 114 via the controller 110 independent of the processor 102 or any other hardware or function of the system 100. In a particular embodiment, in addition to implementing and managing the selective metadata storage module 114, the controller 110 may also be a data storage controller.

The system 100 may include a secondary energy store 120, such as a capacitor, battery, back electromotive force, or other power source. The secondary power store may be used to provide power for a limited time to the system 100. The system 100 may use the secondary power store 120 to allow contents of a volatile memory to be saved to a nonvolatile memory.

During operation, the processor 102 may send a command to the memory device 108 to retrieve or store data. The controller 110 can receive the command from the processor 102 and determine a physical location of data corresponding to a logical block address (LBA) associated with the command via the mapping system module 112. The controller 110 can also implement the selective metadata storage module 114.

The selective metadata storage module 114 may selectively store a metadata base map in the first data storage medium 116 or the second data storage medium 118. A metadata base map may be an initial metadata state at a specific point, such as a power-on or a metadata update event. The metadata base map can include information, such as an LBA-to-physical address mapping table, to allow the controller 110 to determine a physical memory address from the logical block address. The selective metadata storage module 114 may also selectively store metadata updates separately from the metadata base map in the first data storage medium 116 or the second data storage medium 118.

The controller 110, via the selective metadata storage module 114 or the mapping system module 112, may update a live copy of the metadata base map with the metadata updates as they occur and also separately store a backup copy of the metadata updates. Alternatively, at specific points, the data storage device 108 may combine the metadata updates with the metadata base map to create a new metadata base map and start tracking the metadata updates from that point. The specific points may be triggered by power-on or power-off events, a size of the metadata updates, a length of time since the current metadata base map was created, inactivity of the data storage device, detected errors in the metadata base map or the metadata updates, any condition that might be beneficial to update create a new metadata basemap, or any combination thereof.

The metadata updates can include changes to the metadata base map. The metadata updates may be stored as journal entries in a journaling metadata system (much like a journaling file system), where a journal entry may be included for each update. In one embodiment, the mapping system module 112 can implement a log structured mapping system that includes a hierarchy of tables to allow the lookup of a physical address location from a LBA. The mapping system module 112 may be implemented via hardware, software, or a combination of both.

Further, the selective metadata storage module 114 may select the memories to store the metadata base map and the metadata updates based on characteristics of the device. In some instances, the data storage device 108 may include the second data storage medium 118 that is a volatile memory and a first data storage medium 116 that is a nonvolatile memory. In a particular embodiment, the data storage device, via the controller 110, may store the metadata base map and the metadata updates in the second data storage medium 118 and selective copy the metadata base map and/or the metadata updates to the first data storage medium 116 based on characteristics of the data storage device 108. In a particular embodiment, the second data storage medium 118 can have a faster write time and a lower latency than the first data storage medium 116.

The characteristics of the data storage device 108 may include any attribute of the device or data storage mediums that may affect the storage of data, such as size of data, frequency of writing, transfer rate, latency, endurance, degradation, size, usage patterns, access style (such as block versus random), power, power state changes, volatility, power backup capabilities, warranty specifications, or any combination thereof. The characteristics of the device may also include a current state of the memories, jointly or individually. The current state may include a fill percentage of the memory, a fill rate of the memory, a degradation of the memory, a number of erase cycles performed on the memory, a warranty specification of the memory or device, or any combination thereof. The warranty specification may include a length of time the memory device has been in service, an amount of time the memory device has been in use, a number of write or erase cycles to the memory, or any combination thereof.

In another particular embodiment, the data storage device 108 may determine that the metadata base map and the metadata updates are to be stored in different memories. This may occur, for example, when a metadata base map is too large to allow the metadata updates to also be stored in the same memory. In deciding which memory to store the metadata updates to and which memory to store the metadata base map to, the data storage device 108 may consider the frequency at which each is updated.

For example, the first data storage medium 116 may be Flash memory and the second data storage medium 118 may be NVRAM, and the selective metadata storage module 114 may store the metadata updates in the second data storage medium 118 and store the metadata base map in the first data storage medium 116. This may occur when the metadata updates are updated more frequently than the metadata base map. Also, the selective metadata storage module 114 may store the metadata base map in the second data storage medium 118 and store the metadata updates in the first data storage medium 116 when the metadata updates are larger than the metadata base map. Various situations may arise where the selective metadata storage module 114 may swap which memory the metadata updates and the metadata base map are stored to.

In another embodiment, when the metadata base map may exceed a size of a cache memory, only a portion of the metadata base map may be loaded into the cache while the remainder can be stored in the first data storage medium 116, which may be a nonvolatile memory.

In yet another embodiment, selective metadata storage module 114 may store the metadata base map and the metadata updates in the same memory, either in the first data storage medium 116, the second data storage medium 118, or in another memory. For example, this may occur when higher priority items have consumed the resources (available storage space) of one of the memories. In another embodiment, default locations for the metadata base map and the metadata updates may be used to avoid using resources and time to determine if there is another optimal storage space for either. For example, this may be beneficial when the storage device is under a high workload and performing the calculations would delay the workload being performed.

Figure 2:
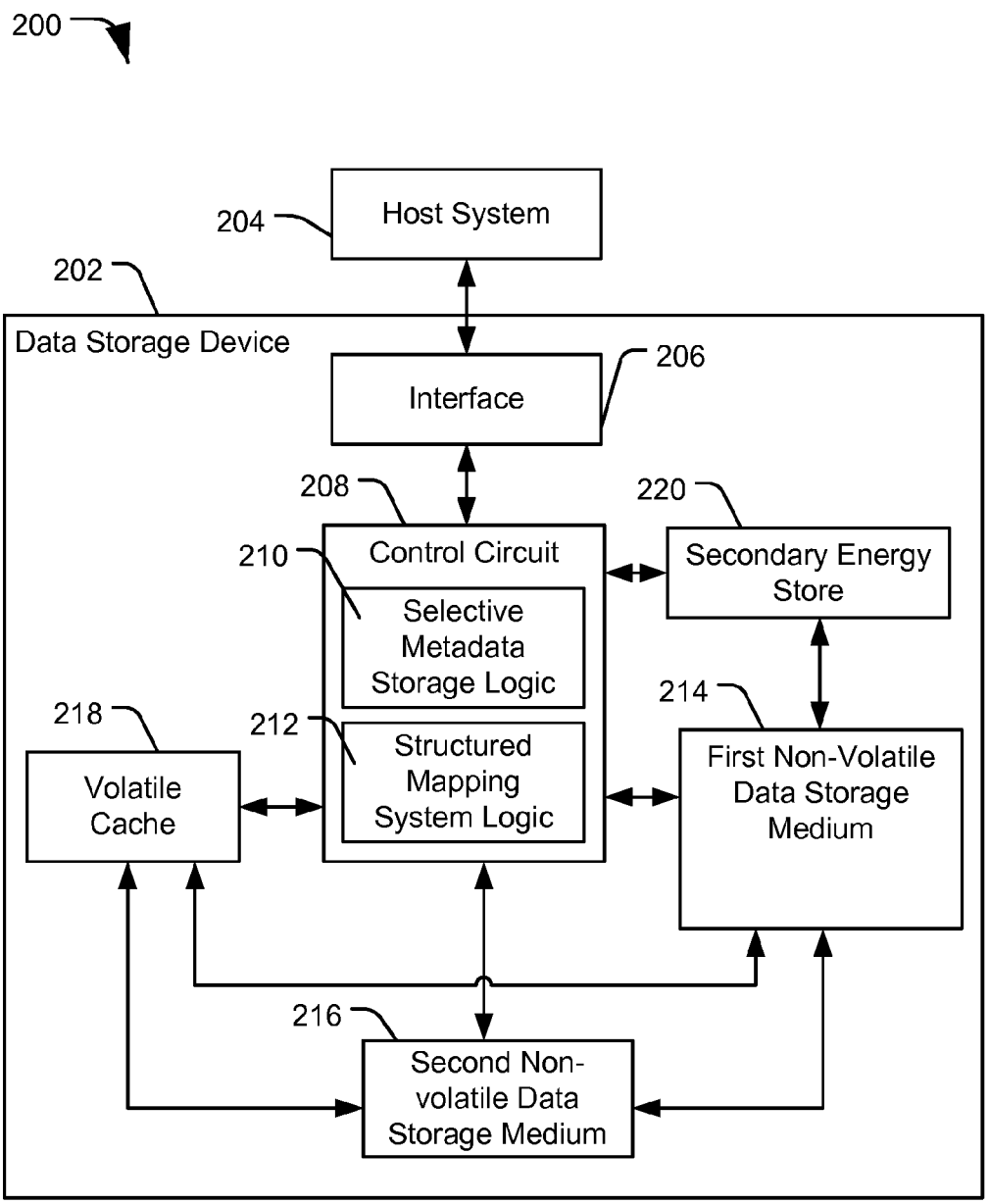
FIG. 2 is a diagram of another illustrative embodiment of a system having selective metadata management.

FIG. 2 shows a diagram of another illustrative embodiment of a system 200 having selective metadata management. The system 200 may include a data storage device 202 and a host system 204. The data storage device 202 may communicate to the host 204 via a hardware and software based interface 206 that is capable of receiving commands and data from the host

204. The commands received from the host 204 may include a logical block address (LBA) associated with command.

The data storage device 202 may also include a control circuit 208, such as a discrete hardware circuit or a programmable controller, that includes selective metadata storage logic 210 and is configured to determine a physical storage location associated with a LBA. In a particular embodiment, the control circuit 208 may include a structured mapping system module 212 to implement a hierarchical look-up system to determine a physical location corresponding to a LBA. The structured mapping system module 212 may be implemented via hardware, software, or a combination of both.

The control circuit 208 may be coupled to a first non-volatile data storage medium 214, a second non-volatile data storage medium 216, and a volatile memory 218. In a particular embodiment, the first non-volatile data storage medium 214 comprises NAND Flash (or similar) and acts as the main data store; the second non-volatile data storage medium 216 comprises NVRAM, such as non-volatile static random access memory (NVSRAM), phase-change memory (PCM), or similar; and the volatile memory 218 comprises a volatile random access memory (RAM) such as dynamic RAM (DRAM), SRAM, or similar. However, the types of memories could vary and, in addition to the above, may include rotating media (such as a magnetic disc or optical disc), programmable read-only-memory (ROM), or other types of memories.

The data storage device 202 may also include a secondary energy store 220, such as a capacitor, a battery, back electromotive force, or other power source. The secondary energy store may be used to provide power for a limited time to the data storage device 202. The data storage device may use the secondary energy store 220 to allow contents of the volatile memory 218 to be saved to at least one of the nonvolatile memories 214 and 216.

During operation, the host 204 may send a command to the data storage device 202 to retrieve or store data. The control circuit 208 can receive the command from the host 204 via the interface 206 and determine a physical location of data corresponding to a LBA associated with the command. The control circuit 208 can also include the selective metadata storage logic 210 configured to selectively store a metadata base map in the first data storage medium 214, the second data storage medium 216, or the memory 218.

The metadata base map can include information, such as an LBA-to-physical address mapping table, to allow the control logic 208 to determine a physical memory address from the LBA. The selective metadata storage logic 210 may also selectively store metadata updates separately from the metadata base map. The metadata updates can include changes to the metadata base map.

In a particular embodiment, a live copy of the metadata base map can be stored in the volatile memory 218 and metadata updates can be stored as journal entries in a journal stored in one of the memories. The live copy of the metadata base map may be copied from the first data storage medium 214 during an initialization routine of the data storage device 202. The metadata updates may be applied to the live copy of the metadata base map when the metadata updates are also stored in the journal. The journal may be stored in a reserved journaling region of the volatile memory 218. Further, the live copy of the metadata base map can be stored to a nonvolatile memory periodically or upon another type of trigger, such as a power event or a capacity limit for the journaling region.

When the reserved journaling region reaches a threshold capacity, the live copy of the metadata base map and/or the journal(s) may be copied to the first data storage medium 214 and the journal(s) in the reserved journaling region may be deleted. Thus, freeing space for new journal entries to be stored in the reserved journaling region.

In an embodiment where the journal(s) are copied to the first data storage medium 214, the live copy of the metadata base map stored in the memory 218, which has already been updated with the journals stored on the first data storage medium 214, may be copied to the first data storage medium 214 when the collective journal entries stored in the first data storage medium 214 reach a capacity threshold. Then, the journals stored in the first data storage medium 214 can be deleted as they are no longer needed.

In a particular embodiment, the first data storage medium 214 has a larger capacity than the second data storage medium 216 and may also have a comparably high latency when writing data, and in some instances may comprise NAND Flash memory. The second data storage medium 216 may have a small capacity compared to the first data storage medium 214 and may also have a comparably low latency and high bandwidth when writing data, and in some instances may comprise NVSRAM or PCM memory. In some instances, the second data storage medium may also be used as a main store, or at least part of it may be used as a main store (e.g. an addressable address space to store data from the host). Further, the memory 218, which may be volatile, may also have a low latency and high bandwidth, and may comprise DRAM, SRAM, or similar memory.

If power is lost to the data storage device 202, the live copy of the metadata base map, the journal(s), or the whole reserved journaling region can be copied to the second data storage medium 216. This may help prevent any metadata updates that were not saved to a nonvolatile version of the base map to be saved upon power loss. The data storage device 202 may then update the last saved base map with the saved metadata updates once power is restored.

In another embodiment, the second data storage medium 216 comprises a type of memory that is not a random access memory, such as a serial Flash memory. In yet another embodiment, the memory 218 comprises a nonvolatile memory and the second data storage medium 216 may then not be needed. In still another embodiment, when the data storage device 202 includes a power source capable of operating the first data storage medium 214 after a power loss, the second data storage medium may not be needed and the data storage device 202 may write the live copy of the metadata base map or the journals to the first data storage medium 214 using the secondary power source.

Figure 3:
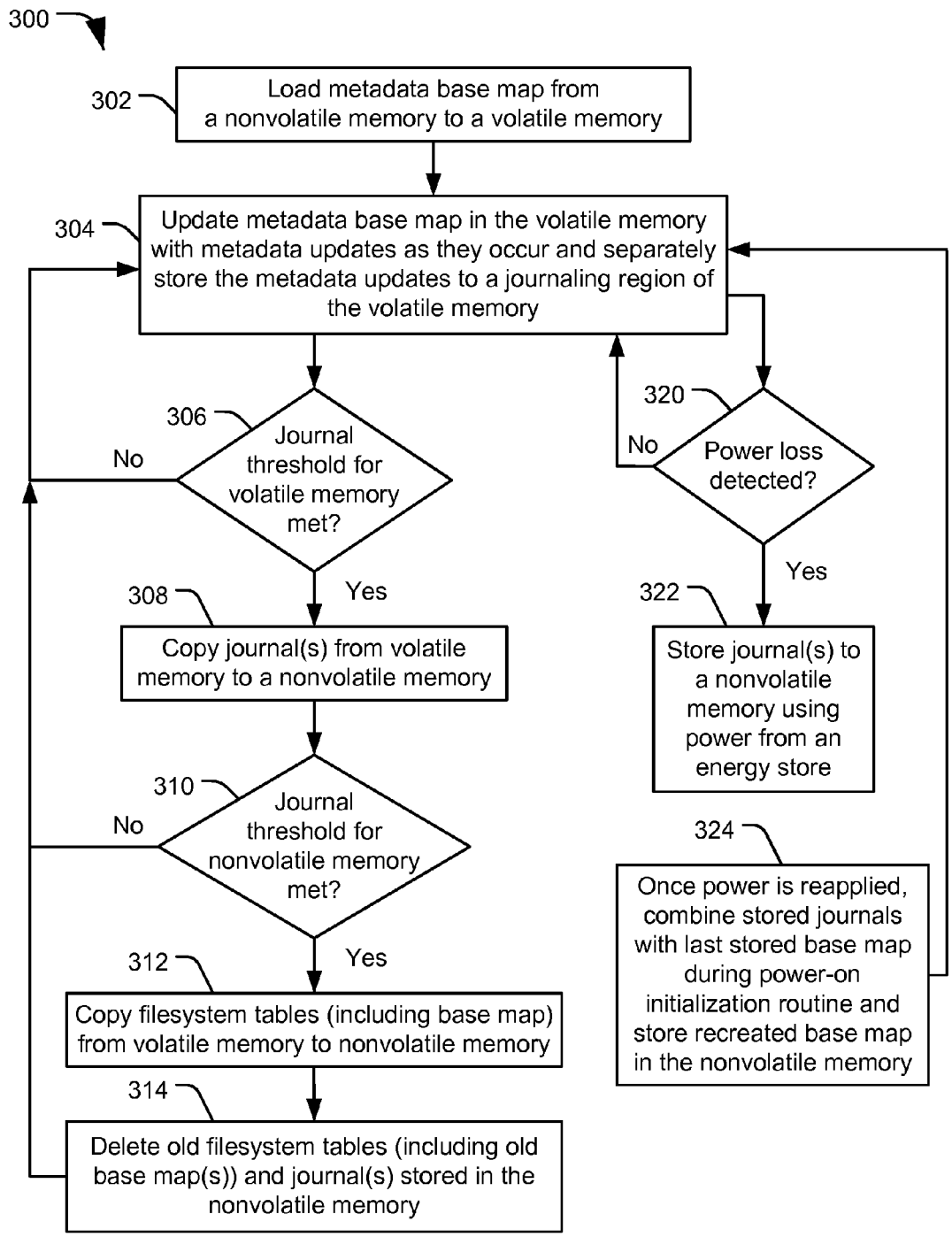
FIG. 3 is a flowchart of an embodiment of a method for selective metadata management for a data storage device.

FIG. 3 shows a flowchart of an embodiment of a method 300 for selective metadata management for a data storage device. The method 300 can include loading a metadata base map from a first non-volatile data storage medium, such as the first data storage medium 214, to a volatile memory, such as memory 218, at 302. When the metadata base map has been loaded into the volatile memory, it may be considered a "live copy" which the system uses to perform various data management functions. Metadata updates can be applied to the live copy of the metadata base map as they occur and the metadata updates may also be stored as journal entries in a journaling region of a memory, at 304. For example, the journal(s) may be stored in a region of the volatile memory reserved for journaling.

When a threshold is met, at 306, the live copy of the metadata base map, the journal(s), or both can be copied to a nonvolatile memory for power safe storage, at 308. The threshold may be a time period, a capacity of the reserved journaling region, a power event, a size of the journal(s), a workload of the data storage device, or any other type of threshold or trigger that may indicate when to copy the journal(s) or the live copy of the metadata base map to nonvolatile memory.

Also, when another threshold (such as a journal threshold for nonvolatile memory) is met, at 310, any filesystem tables (including the live copy of the base map) stored in volatile memory may be copied to nonvolatile memory, at 312. Then, the old filesystem tables (including the old base map(s)) and journal(s) may be deleted from the nonvolatile memory, at 314. When the threshold is not met, at 310, the method 300 may continue storing metadata in the journal(s). The another threshold may be a time period, a capacity of the journaling region on the nonvolatile memory, a power event, a size of the journal(s), a workload of the data storage device, or any other type of threshold or trigger that may indicate when to copy the filesystem tables to nonvolatile memory or delete the journal(s) form nonvolatile memory.

In some embodiments, once the live copy of the metadata base map is stored to nonvolatile memory, the journal(s) may be deleted, at 314. Alternatively, the journal(s) may be stored to a nonvolatile memory whether or not the live copy of the metadata base map is stored to a nonvolatile memory.

In an embodiment where the journal(s) are stored to a nonvolatile data storage medium, such as the first data storage medium 214, the system 300 may monitor a size or capacity of the journals stored in the nonvolatile data storage medium and, when the collective journal entries stored therein reach a certain capacity threshold, the live metadata base map stored in the volatile memory may be copied to the nonvolatile data storage medium. Then, the journal(s) stored in the nonvolatile data storage medium can be erased as they are no longer needed.

In another embodiment, the system 300 may monitor and detect a power event, such as a power loss condition, a power surge, or an electrostatic discharge event, at 320. When a power event is detected, the journal(s), the live copy of the base map, or the whole reserved journaling region, can be copied to a nonvolatile memory using power from a secondary energy store within the data storage device, at 322. The nonvolatile memory may have a low latency and/or high bandwidth. This may help prevent any metadata updates that were not updated to a last stored version of the base map, in a power safe memory, to be saved upon the detected power event.

The data storage device may then re-create the live copy of the metadata base map by combining the last saved metadata base map with the stored journal(s) saved in nonvolatile memory once power is restored, at 324. For example, the metadata updates stored in the journal(s) may be combined with a last saved metadata base map during a power-on initialization routine when the data storage device detects metadata updates stored in journal(s) that are newer than the last saved metadata base map. The method 300 may then store the re-created live base map to nonvolatile memory and re-start the journaling of the metadata updates. Alternatively, the method 300 may not immediately store the re-created live copy of the metadata base map in the nonvolatile memory. Instead, the method 300 may store the re-created live copy of the metadata base map in the volatile memory and return to step 304. For example, logic may be added to the data storage device 202 and/or method 300 to determine which of the journaled metadata updates are still needed after the re-creation of the live copy of the metadata base map.

Figure 4:
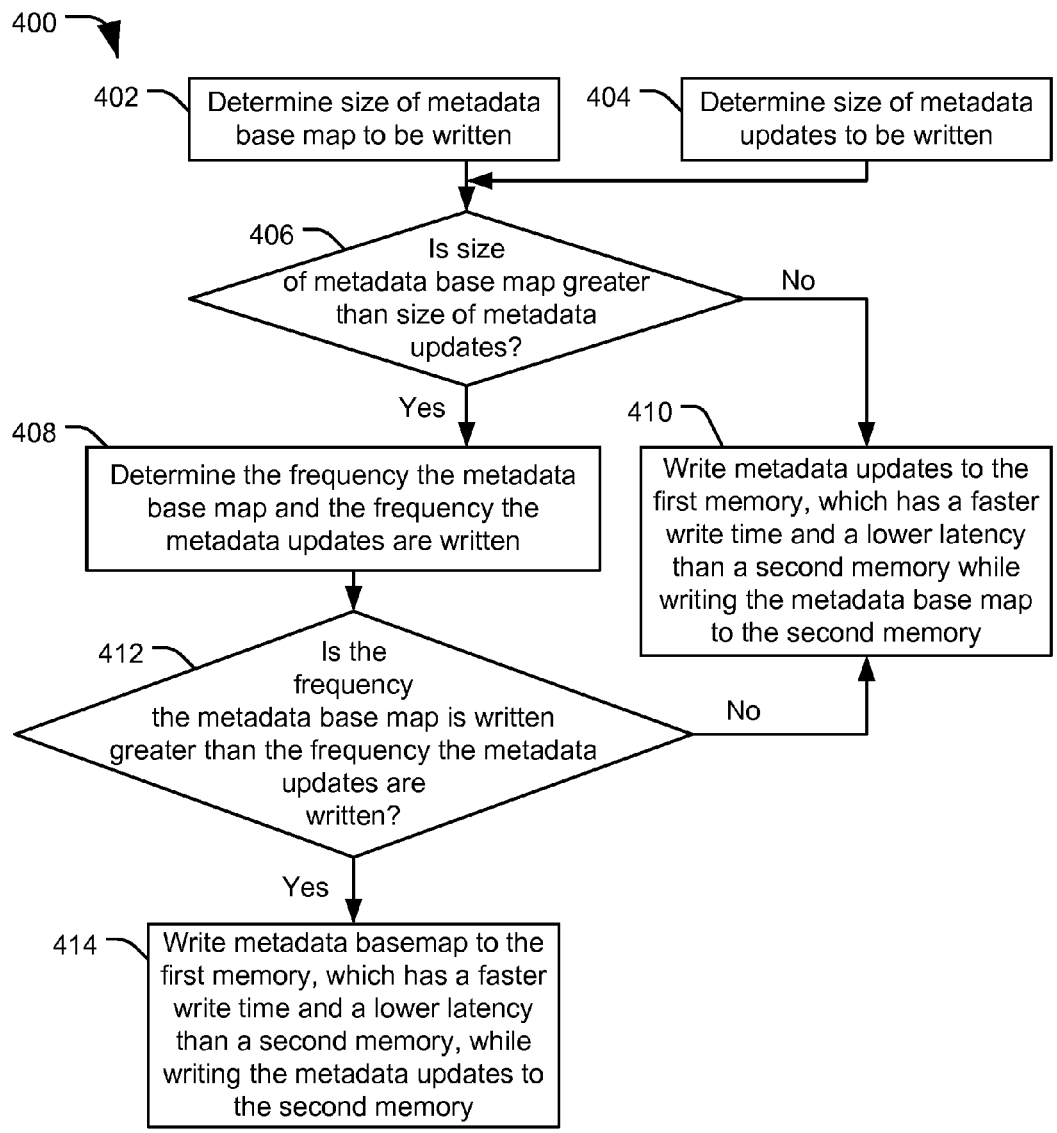
FIG. 4 is a flowchart of another embodiment of a method for selective metadata management for a data storage device.

FIG. 4 shows a flowchart of an embodiment of a method 400 for selective metadata management for a data storage device. The method 400 may be used to determine which memories to use to backup the metadata base map and the metadata updates. For example, a data storage device, such as data storage device 202 shown in FIG. 2, may include a first memory that is nonvolatile, such as Flash memory, and a second memory that is nonvolatile, such as NVSRAM.

The method 400 can include determining a size (i.e. an amount of data storage required) of a metadata base map, at 402, and determining a size of metadata updates, at 404. The method 400 may then determine whether the metadata base map or the metadata updates has a larger size, at 406. If the metadata updates are larger than the metadata base map, the method 400 may store the metadata updates to a first memory having a faster write time and lower latency than a second memory, at 410. This setting may also be a default setting for a storage device prior to running the method 400.

If the metadata base map is larger than the metadata updates, the method 400 may determine a frequency of updating (or rewriting) of the metadata base maps and the metadata updates, at 408. The method 400 may then determine if the frequency of writing the metadata base map is greater than the frequency of writing the metadata updates, at 412. If the frequency of writing the metadata updates is greater than the frequency of writing the base maps, the method 400 may store the metadata updates to the first memory having the faster write time and lower latency than the second memory, at 410

If the frequency of writing the metadata base map is greater than the frequency of writing the metadata updates, the method 400 may store the metadata base map to the first memory having the faster write time and lower latency than the second memory, at 414.

Figure 5:
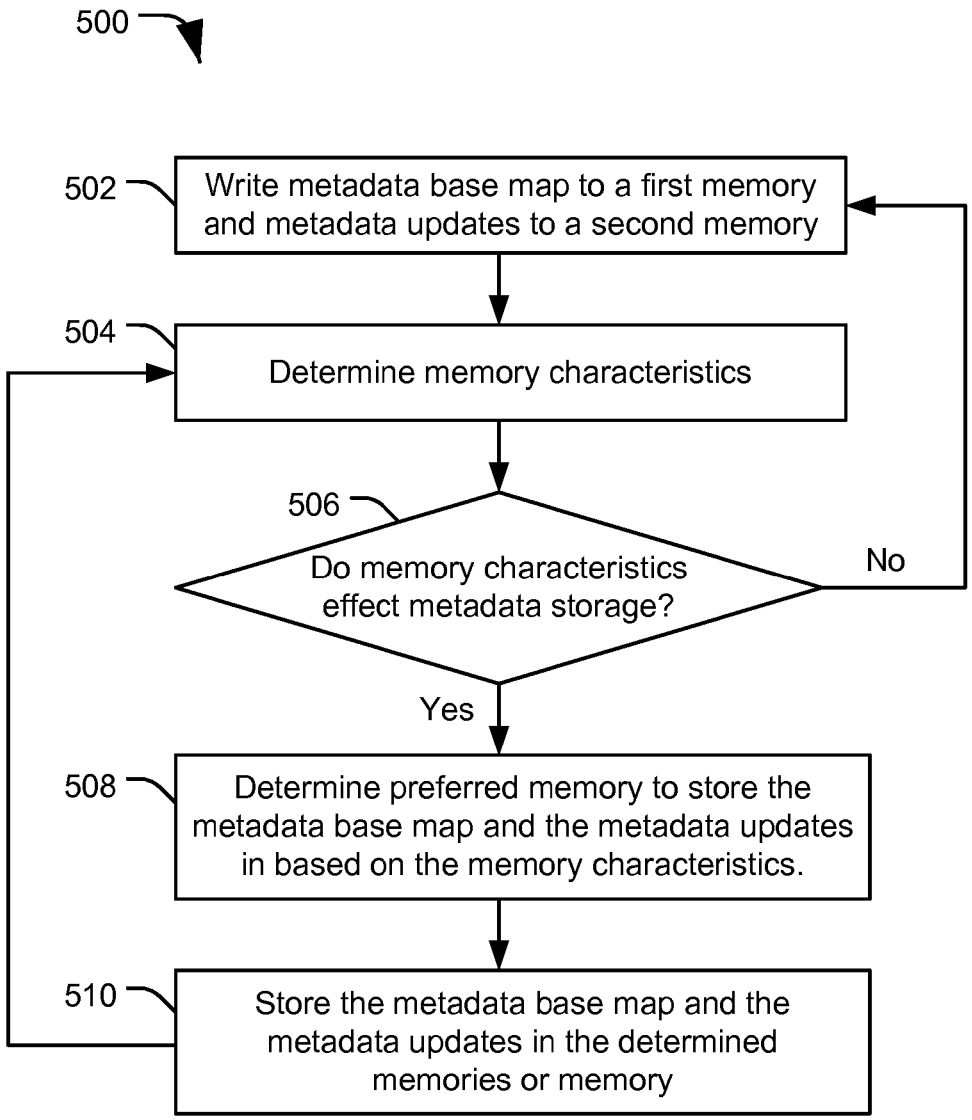
FIG. 5 is a flowchart of another embodiment of a method for selective metadata management for a data storage device.

FIG. 5 shows a flowchart of another embodiment of a method 500 for selective metadata management for a data storage device. The method 500 may be run continuously within a data storage device or run at optimal times, such as when background resources are available. The method 500 may include writing a metadata base map to a first memory and writing metadata updates to a second memory, at 502. The first memory and the second memory may be different types of memory that have different data storage characteristics, such as the second memory may have a faster write time and lower latency than the first memory. In a particular embodiment, the first memory is a Flash memory and the second memory is NVRAM.

The method 500 may include determining memory characteristics of one or both of the first memory and the second memory, at 504. The characteristics may be determined based on settings of memories, programmed values, sensed values, user inputs, or any combination thereof. For example, the characteristics may include any attribute of the device or data storage mediums that may affect the storage of data, such as write speed, size of data, frequency of writing, transfer rate, latency, endurance, degradation, size, usage patterns, access style (such as block versus random), power, power state changes, volatility, power backup capabilities, warranty specs, or any combination thereof. The characteristics of the device may also include a current state of the memories, jointly or individually. The current state may include a fill percentage of the memory, a fill rate of the memory, a degradation of the memory, a number of erase cycles performed on the memory, a warranty specification of the memory or device, or any combination thereof. The warranty specification may include a length of time the memory device has been in service, an amount of time the memory device has been in use, a number of write or erase cycles to the memory, or any combination thereof.

The method 500 may also include determining if the memory characteristics affect the metadata storage, at 506. If the characteristics do not affect metadata storage, then no changes may be needed and the method 500 may return to the default, at 502. If the characteristics do affect metadata storage, then the method 500 can include determining a preferred memory to store the metadata base map and the metadata updates in based on the characteristics, at 508. This may lead to the method 500 swapping which memories store the metadata base map and the metadata updates, storing the metadata base map and the metadata updates in one memory, or not making any changes to the default storage locations. The method 500 may then store the metadata base map and the metadata updates in the determined memories or memory, at 510. The method may optionally repeat itself and return to determining (i.e. monitoring) the memory characteristics, at 504.

The embodiments and methods of a journaling metadata system described above may be implemented on a single data storage device, such as a solid state drive or a disc drive. A controller or control circuit that implements the journaling metadata system within the data storage device may be implemented independent of any controller or host system external to the single data storage device. For example, the journaling metadata system implemented within the single drive may be implemented completely independent of a host controller, such as a RAID controller. Further, the data storage device may implement a standardized interface platform that is independent of the journaling metadata system.

It is to be understood that even though numerous characteristics and advantages of various embodiments have been set forth in the foregoing description, together with details of the structure and function of the various embodiments, this disclosure is illustrative only, and changes may be made in detail, especially in matters of structure and arrangement of parts. For example, the embodiments described herein can be implemented for any type of data storage device that uses logical block addresses and has more than one type of memory, such as solid state memory devices, disc drives, or hybrid data storage devices. Further, the methods describe herein may be implemented by a computer processor, controller, hardware circuits, or any combination thereof. Also, the particular elements may vary depending on the particular application for the data storage system while maintaining substantially the same functionality without departing from the scope and spirit of the present disclosure. In addition, although an embodiment described herein is directed to a solid state data storage system, it will be appreciated by those skilled in the art that the teachings of the present application can be applied to any type of data storage device or computer system that may benefit from the ideas, structure, or functionality disclosed herein.

What is claimed is:

1. A device comprising:
   a control circuit configured to:
      select a memory from a first memory and a second memory in which to store a metadata base map, the metadata base map including information to determine a physical memory address from a logical block address;
      store metadata updates separately from the metadata base map, the metadata updates comprising changes to the metadata base map; and
      select between the first memory and the second memory to store the metadata updates based on characteristics of the device.

2. The device of claim 1 further comprising:
   the second memory has a faster write time than the first memory,
   the control circuit configured to:
      store the metadata updates in the second memory, and
      store the metadata base map in the first memory when the metadata updates are updated more frequently than the metadata base map.

3. The device of claim 2 comprising the control circuit further configured to:
   store the metadata updates in the first memory and store the metadata base map in the second memory when the metadata base map is updated more frequently than the metadata updates.

4. The device of claim 1 wherein the device is configured to re-create a live copy of the metadata base map by using the metadata updates.

5. The device of claim 1 further comprising:
   the first memory includes a volatile memory coupled to the control circuit;
   the second memory includes a nonvolatile memory coupled to the control circuit; and
   the control circuit is configured to:
      store the metadata updates and the metadata base map in the volatile memory; and
      select between the metadata base map and the metadata updates to store to the nonvolatile memory based on the characteristics of the device.

6. The device of claim 5 further comprising:
   the characteristics of the device comprise a size of the metadata update; and
   the control circuit is configured select between the metadata base map and the metadata updates to store to the nonvolatile memory when the size of the metadata updates is greater than a storage capacity threshold for the metadata updates.

7. A memory device storing instructions to cause a processor to perform a method comprising:
   storing a metadata base map in a volatile memory, the metadata base map including information to determine a physical memory address from a logical block address;
   updating the metadata base map with metadata updates comprising changes to the metadata base map;
   storing the metadata updates separately from the updated metadata base map; and
   selecting between the updated metadata base map and the metadata updates to store to a first nonvolatile memory based on characteristics of the memory device.

8. The memory device of claim 7, wherein the method further comprises:
   the characteristics of the device include a power state;
   storing the metadata updates to the first nonvolatile memory when a power loss is detected using power from a backup power source; and
   updating a copy of the metadata base map in the first nonvolatile memory using the metadata updates once normal power is restored.

9. The memory device of claim 8, wherein the method further comprises:
   storing the metadata updates to a second nonvolatile memory instead of the first nonvolatile memory when a power loss is detected, the second nonvolatile memory having a lower write latency than the first nonvolatile memory.

10. The memory device of claim 7, wherein the method further comprises re-creating a live copy of the metadata base map by using the metadata updates.

11. The memory device of claim 7, wherein the method further comprises:

storing the metadata updates in a storage area of the volatile memory reserved for metadata updates.

12. A device comprising:

a first memory;

a second memory;

a controller configured to:

select a memory from the first memory and the second memory in which to store a metadata base map, the metadata base map including information to determine a physical memory address from a logical block address;

store metadata updates separately from the metadata base map, the metadata updates comprising changes to the metadata base map; and select between the first memory and the second memory to store the metadata updates based on characteristics of the device.

13. The device of claim 12 further comprising:

the first memory having a first write latency and a first capacity; and the second memory having a second write latency shorter than the first write latency and a second capacity smaller than the first capacity.

14. The device of claim 13 further comprising:

a secondary power source;

the second memory includes a volatile memory;

the characteristics include a power state of the device;

the controller further configured to:

store a copy of the metadata base map from the first memory to the second memory;

update the copy of the metadata base map with changes to the metadata base map;

store the metadata updates in the second memory separately from the copy of the metadata base map; and store the metadata updates to the first memory using the secondary power source when loss of a primary power source is detected.

15. The device of claim 14 further comprising:

a third memory including a nonvolatile memory having a third write latency shorter than the first write latency;

the controller further configured to:

store the metadata updates to the third memory instead of the first memory using the secondary power source when loss of a primary power source is detected.

16. The device of claim 13 comprising the controller further configured to:

determine a size of the metadata base map and the metadata updates;

store the metadata updates to the second memory if the metadata updates are larger than the metadata base map.

17. The device of claim 13 comprising the controller further configured to:

determine a write frequency to the metadata base map and the metadata updates; and select between the metadata updates and the metadata base map, based on the highest write frequency, to store to the second memory.

18. The device of claim 13 comprising the controller further configured to:

store the metadata base map to the first memory and the metadata updates to the second memory; and move the metadata updates to the first memory when a metadata update capacity of the second memory exceeds a first threshold.

19. The device of claim 18 comprising the controller further configured to:

store a copy of the metadata base map from the first memory in the second memory;

update the copy of the metadata base map with changes to the metadata base map to create an updated copy;

store the metadata updates in the second memory separately from the copy of the metadata base map; and replace the metadata base map in the first memory with the updated copy when a metadata update capacity of the first memory exceeds a second threshold.

20. The device of claim 12 further comprising:

each of the metadata updates include a journal entry of a journal maintained by a journaling metadata system; and the second memory includes a reserved area for storage of at least one journal.

* * * * *